Patented Mar. 23, 1948

2,438,404

UNITED STATES PATENT OFFICE 2,438,404

TREATMENT OF HYDROCARBONS

Stanford J. Hetzel, Cheltenham, and Robert M. Kennedy, Drexel Hill, Pa., assignors to Sun Oil Company, Philadelphia, Pa., a corporation of New Jersey No Drawing. Application January 20, 1948, Serial No. 3,373

4 Claims. (Cl. 260—666)

This application is a continuation in part of application Serial No. 636,270, filed December 20, 1945, by the instant inventors.

This invention relates to cyclization. Specifically it relates to the dehydrogenation and cyclization of dehydrogenatable hydrocarbons, having 5 carbon atoms per molecule, especially 1,3 pentadiene. More specifically the invention is concerned with a commercially feasible process for the conversion of pentane, 1-pentene or 1,3 pentadiene to 1,3 cyclopentadiene.

As stated, the invention is applicable to the dehydrogenation and cyclization of pentane to 1,3 cyclopentadiene. This conversion is considered to take place by way of 1-pentene and 1,3 pentadiene. Accordingly, the invention will be described with reference to the conversion of 1,3 pentadiene to 1,3 cyclopentadiene to which it is pre-eminently suited. These reactions can be represented as follows:

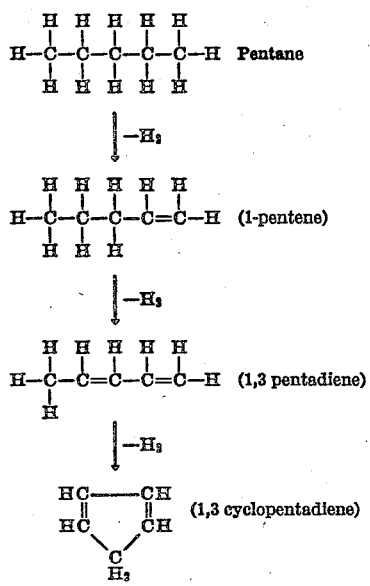

According to the invention, 1,3 pentadiene in pure form, or admixed with normal pentane and/or normal pentenes, or other gases, is contacted with a mass consisting essentially of an alumina, which has been activated to yield a material having a highly porous adsorbent surface structure, at an elevated temperature for a time sufficient to effect a desired extent of conversion to 1,3 cyclopentadiene.

The temperature employed for the dehydrogenation of the hydrocarbons, in the instant case 1,3 pentadiene, will vary depending upon the other conditions of operation and on the nature or purity of the charging stock. However, the conversion of 1,3 pentadiene can be effected advantageously at a temperature within the range 300° C. to a temperature beyond which excessive decomposition of the hydrocarbons will take place. More specifically a temperature within the range 400° C.–700° C., preferably 450° C.–650° C., can be employed.

While the conversion per pass is substantially independent of pressure it has been found that lower pressures seem to form higher yields on recycling. Accordingly, while higher and lower pressures are not excluded from the scope of the invention pressures in the range of 1000 mm. Hg–10 mm. Hg, abs., preferably 200 mm. Hg–10 mm. Hg, can be employed.

The time of contact of the 1,3 pentadiene with the alumina is a factor to be considered. There is an optimum range of contact time corresponding to charging rates of 0.25 gram/minute/100 grams of alumina. However, higher and lower charging rates are not excluded from the scope of the invention.

Example 350 grams of 1,3 pentadiene were charged at a rate of 10 grams/minute, at a pressure of about 200 mm. Hg, to 1000 grams of a mass, consisting of alumina which had been activated, in a conversion tube at a temperature of 600° C. The effluent from the conversion tube was cooled, condensed and fractionated, resulting in a yield of 15 grams of 1,3 cyclopentadiene. On recycle of the unconverted 1,3 pentadiene the yield is 44 grams.

As stated, the alumina employed in the practice of the invention is in an activated state. Activated aluminas are well known as catalysts for dehydrogenation purposes and their preparation is well known. Thus, aluminas in an activated state can be prepared in a variety of manners. In U. S. Patent No. 1,868,869 the deposit or scale formed in the precipitation tanks of the Fickes-Sherwin modification of the Bayer process is calcined at a temperature in the range 300° C.–800° C. In U. S. Patent No. 2,015,593 an alumina which has been activated is prepared by calcining aluminum trihydrate, or a material such as bauxite containing aluminum trihydrate, within substantially the aforesaid temperature range. Also, aluminas in an activated state can be prepared by precipitating aluminum hydroxide by passing carbon dioxide into an aqueous sodium aluminate solution and drying the resulting product in air at about 600° C. Other methods of preparation of aluminas in an activated state are known and described in the literature.

The alumina in activated state, employed in this invention, is a material having a highly porous and adsorbent surface structure. Its bulk density is usually within the approximate range 50–55 lbs. per cu. ft. (0.80–0.86 gram per cc.). Upon analysis such aluminas will show, say, in excess of 90% $Al_2O_3$ and a loss on ignition in the neighborhood of about 5–10%. The loss on ignition represents substantially water in combined form. The term "alumina" as used herein and in the claims refers only to aluminas in an activated state prepared by the processes herein mentioned or described or by processes which yield an equivalent alumina.

The contact mass can be regenerated indefinitely to substantially its original activity.

The particle or pellet size can be varied. About 4 to 8 mash has been found quite satisfactory. Obviously the particle size should not be too small in the sense that a large pressure drop across the contact mass is to be avoided if substantially the same pressure in all parts of the apparatus is desired, unless fluid or fluidized operation is employed.

In copending applications for patent, Nos. 630,691, now Patent 2,438,399, and 630,692, now Patent 2,438,400, filed November 24, 1945; 769,523, now Patent 2,438,403, and 769,522, now Patent 2,438,402, filed August 19, 1947, there are described and claimed processes for the preparation of 1,3 cyclopentadiene by dehydrogenation and cyclization employing respectively contact masses as follow: silica gel, chromia on alumina, iron or steel and fused alumina. In Serial No. 769,521, filed August 19, 1947, now Patent 2,438,398, there is described and claimed a process for the dehydrogenation and cyclization of 1,3 pentadiene to 1,3 cyclopentadiene which comprises subjecting said hydrocarbon to dehydrogenation at a temperature within the range of 300° C. to a temperature beyond which excessive decomposition of the hydrocarbons will take place for a time sufficient to effect a desired extent of dehydrogenation and cyclization.

It will be apparent to those versed in the art that wide modification and variation are possible within the scope of the invention as defined in the appended claims, the essence of the invention being in that dehydrogenatable hydrocarbons having 5 carbon atoms per molecule can be dehydrogenated and cyclized by contacting the same at elevated temperature and suitable pressure with a mass consisting essentially of an alumina which has been activated as set forth herein and in the appended claims.

We claim:

1. A process for the dehydrogenation and cyclization of 1,3 pentadiene to 1,3 cyclopentadiene which comprises contacting 1,3 pentadiene with a mass consisting essentially of a porous adsorbent alumina at a temperature of at least about 300° C. up to a temperature at which excessive decomposition of hydrocarbons present will take place for a time sufficient to effect a desired extent of dehydrogenation and cyclization.

2. A process for the dehydrogenation and cyclization of 1,3 pentadiene to 1,3 cyclopentadiene which comprises contacting 1,3 pentadiene with a mass consisting essentially of a porous adsorbent alumina at a temperature within the range 400° C.–700° C. for a time sufficient to effect a desired extent of dehydrogenation and cyclization.

3. A process according to claim 2 wherein the pressure is in the range 1000 mm. Hg–10 mm. Hg.

4. A process for the dehydrogenation and cyclization of 1,3 pentadiene to 1,3 cyclopentadiene which comprises contacting 1,3 pentadiene with a mass consisting essentially of a porous adsorbent alumina at a temperature within the range 450° C.–650° C. at a pressure within the range 200 mm. Hg–10 mm. Hg for a time sufficient to effect a desired extent of dehydrogenation and cyclization.

STANFORD J. HETZEL.
ROBERT M. KENNEDY.